(12) United States Patent
Lidsky et al.

(10) Patent No.: US 12,074,523 B2
(45) Date of Patent: Aug. 27, 2024

(54) POWER DELIVERY CONTROL CIRCUIT

(71) Applicant: Empower Semiconductor, Inc., Milpitas, CA (US)

(72) Inventors: David Lidsky, Oakland, CA (US); Timothy Alan Phillips, Hope, RI (US); Parag Oak, Sunnyvale, CA (US); Shrinivasan Jaganathan, Milpitas, CA (US)

(73) Assignee: EMPOWER SEMICONDUCTOR, INC., San Jose, CA (US)

(*) Notice: Subject to any disclaimer, the term of this patent is extended or adjusted under 35 U.S.C. 154(b) by 0 days.

(21) Appl. No.: 17/814,399

(22) Filed: Jul. 22, 2022

(65) Prior Publication Data

US 2022/0360170 A1 Nov. 10, 2022

Related U.S. Application Data

(63) Continuation of application No. 16/714,686, filed on Dec. 13, 2019, now Pat. No. 11,431,247.

(60) Provisional application No. 62/779,403, filed on Dec. 13, 2018.

(51) Int. Cl.
*H02M 3/155* (2006.01)
*H02M 3/158* (2006.01)

(52) U.S. Cl.
CPC ......... *H02M 3/1586* (2021.05); *H02M 3/155* (2013.01)

(58) Field of Classification Search
CPC .................................................. H02M 3/1584
See application file for complete search history.

(56) References Cited

U.S. PATENT DOCUMENTS

| 7,173,403 | B1 | 2/2007 | Chen et al. |
| 9,787,179 | B1 | 10/2017 | Clarkin et al. |
| 9,859,793 | B2 | 1/2018 | Ihs |
| 10,320,282 | B2 | 6/2019 | Diotte et al. |
| 10,574,132 | B2 | 2/2020 | Young |
| 2005/0088156 | A1* | 4/2005 | Cheung ............... H02M 3/1584 323/282 |
| 2009/0267658 | A1* | 10/2009 | Bridge ................ H02M 3/1584 327/141 |

(Continued)

OTHER PUBLICATIONS

H. Seok, S. Kim, W.-S. Choi, M.-J. Kim, J. S. Lee and M. Kim, "Coupled inductor based multi-phase buck converter for magnet power supply," 2017 IEEE Applied Power Electronics Conference and Exposition (APEC), Tampa, FL, USA, 2017, pp. 1020-1026, doi: 10.1109/APEC.2017.7930821. (Year: 2017).*

(Continued)

*Primary Examiner* — Peter M Novak
(74) *Attorney, Agent, or Firm* — Fisher Broyles, LLP

(57) ABSTRACT

A power circuit is disclosed. The power circuit includes an input node, a plurality of inductors each connected to an output node, a plurality of phases each configured to provide current to one of the inductors, and a control circuit configured to trigger the phases. The phases are configured to provide current to one of the inductors in response to being triggered by the control circuit, the control circuit is configured to determine a variable time difference between a first phase being triggered and a second phase being triggered, and the time difference is based at least in part on a voltage difference between an input voltage at the input node and an output voltage at the output node.

19 Claims, 23 Drawing Sheets

(56) References Cited

U.S. PATENT DOCUMENTS

| | | | |
|---|---|---|---|
| 2010/0033154 A1* | 2/2010 | Cheng | H02M 3/1584 |
| | | | 323/293 |
| 2010/0315052 A1 | 12/2010 | Zambetti et al. | |
| 2011/0121804 A1 | 5/2011 | Kudo | |
| 2014/0333270 A1 | 11/2014 | Young et al. | |
| 2016/0164414 A1 | 6/2016 | Hang et al. | |
| 2019/0366850 A1 | 12/2019 | Ge et al. | |
| 2020/0133322 A1* | 4/2020 | Laur | G05F 1/575 |

OTHER PUBLICATIONS

U.S. Appl. No. 16/714,686, "Final Office Action", Jan. 13, 2022, 9 pages.
U.S. Appl. No. 16/714,686, "Final Office Action", Jun. 15, 2021, 18 pages.
U.S. Appl. No. 16/714,686, "Non-Final Office Action", Feb. 12, 2021, 18 pages.
U.S. Appl. No. 16/714,686, "Non-Final Office Action", Sep. 22, 2021, 17 pages.
U.S. Appl. No. 16/714,686, "Notice of Allowance", Apr. 13, 2022, 8 pages.
Saggini, et al., "An Innovative Digital Control Architecture For Low-Voltage, High-Current Dc-Dc Converters With Tight Voltage Regulation", IEEE Transactions on Power Electronics, vol. 19, No. 1, 2004, pp. 210-218.

* cited by examiner

POWER DELIVERY CONTROL CIRCUIT

CROSS-REFERENCES TO RELATED APPLICATIONS

This application is a continuation of U.S. patent application Ser. No. 16/714,686, filed Dec. 13, 2019, for "POWER DELIVERY CONTROL CIRCUIT," which claims the benefit of U.S. Provisional application No. 62/779,403, filed Dec. 13, 2018, titled "POWER DELIVERY CONTROL CIRCUIT," the disclosures of all of which are incorporated herein by reference in their entirety.

FIELD OF THE INVENTION

The present application generally pertains to power delivery circuits, and more particularly to circuits which deliver power to a load using multiple phases

BACKGROUND OF THE INVENTION

New circuits have increased power needs. Therefore, power delivery systems having improved control schemes are needed

BRIEF SUMMARY OF THE INVENTION

One inventive aspect is a power circuit including an input node, a plurality of inductors each connected to an output node, a plurality of phases each configured to provide current to one of the inductors, and a control circuit configured to trigger the phases. The phases are configured to provide current to one of the inductors in response to being triggered by the control circuit, the control circuit is configured to determine a variable time difference between a first phase being triggered and a second phase being triggered, and the time difference is based at least in part on a voltage difference between an input voltage at the input node and an output voltage at the output node.

DETAILED DESCRIPTION OF THE INVENTION

Particular embodiments of the invention are illustrated herein in conjunction with the drawings.

Figure 1:
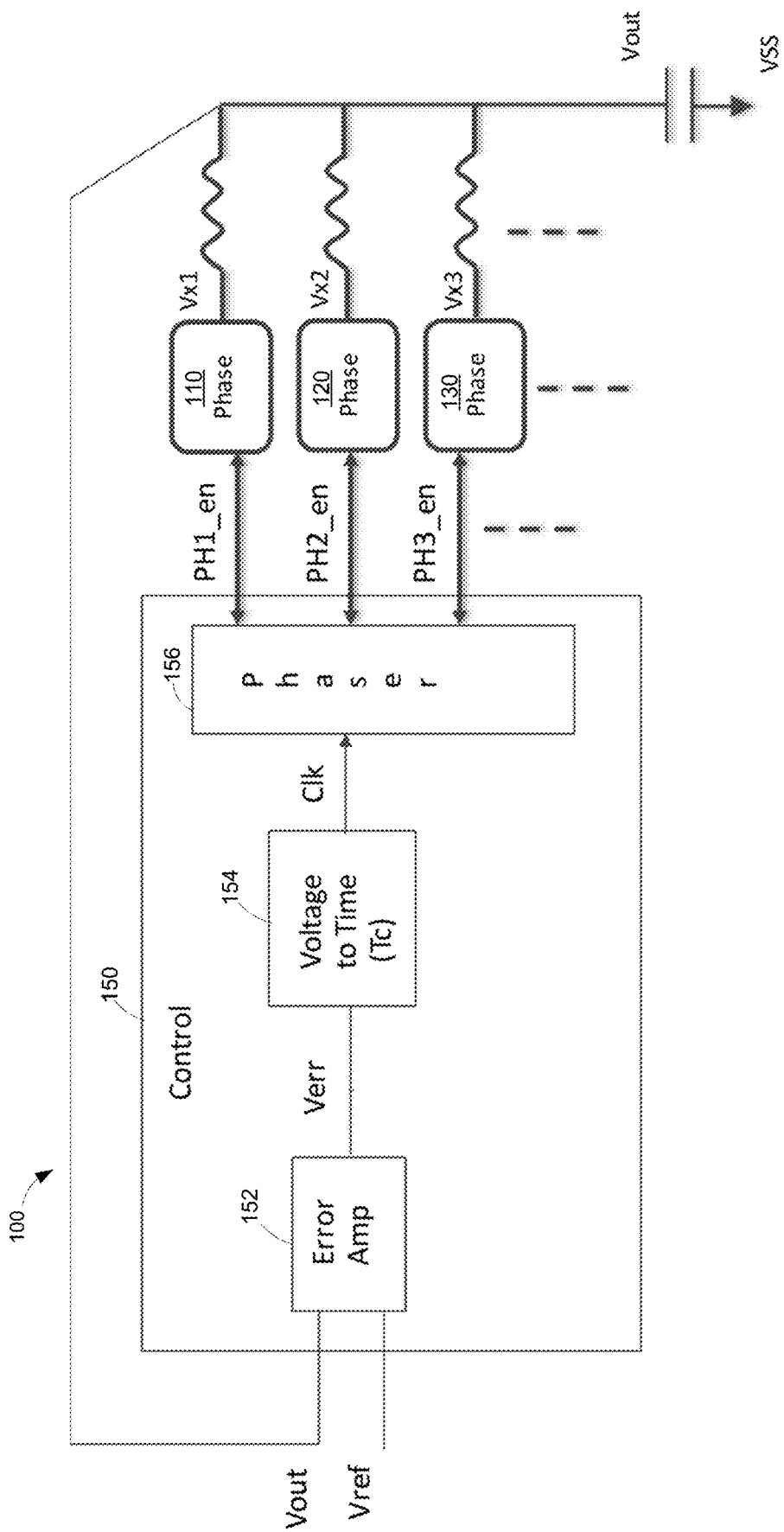
FIG. 1 depicts an illustrative simplified schematic of a power delivery control circuit that can be used in a variety of electronic systems.

FIG. 1 depicts an illustrative simplified schematic of a power delivery control circuit 100 that can be used in a variety of electronic systems. As shown in FIG. 1, the power delivery control circuit includes three phases 110, 120, and 130, however in other embodiments the power delivery control circuit can have from one to any number of phases. In some embodiments each phase can include one or more solid-state switches that regulate power delivered from a power source to a load. In various embodiments each phase can include an arrangement of sequentially coupled solid-state switches while in further embodiments each phase can include a pair of solid-state switches arranged in a synchronous buck converter topology, while in yet further embodiments each phase can be a full-bridge or other type of power regulator circuit.

As further illustrated in FIG. 1, each phase is coupled to and controlled by a control circuit 150. The control circuit 150 includes Vout and Vref nodes as inputs into an error amplifier 152. The error amplifier 152 generates an error voltage at node Verr based on the difference between Vout and Vref inputs. The error voltage can be used as an input into a Voltage to Time circuit 154. In some embodiments, instead of using the error voltage as an input to the Voltage to Time circuit 154, a signal that is derived from the error voltage can be used as an input. In one example the signal can be derived from a Type 2 compensation network. The Voltage to Time circuit 154 is configured to convert the error voltage, or the signal derived from the error voltage, to a controlled time (Tc). In some embodiments, the Voltage to Time circuit 154 sends a series of clock pulses to a phaser circuit 156, where the time between the beginning of the pulses is equal or substantially equal to the controlled time (Tc).

When the phaser circuit 156 receives each clock pulse signal, it determines which of phases 110, 120, and 130 to trigger next and sends a trigger signal to the determined phase. For example, at very light loads only phase 110 may be repetitively triggered so the phaser circuit 156 only sends trigger voltages to phase 110 each time it receives a clock pulse signal. However, at large loads phase 120 may need to be triggered before all of the current or energy in phase 110 is delivered to the load so the phaser circuit 156 sends a first trigger signal to phase 110 and a second trigger signal to phase 120, as illustrated in more detail herein.

In some embodiments, relatively large error voltages (e.g., when Vout is lower than Vref) indicate that more power is required at the load to raise Vout so the Voltage to Time Circuit decreases Tc so there is less time between triggering the phases 110, 120, and 130. Similarly, when Vout is near Vref there is a relatively smaller error voltage that corresponds to an increase in Tc and a longer time between sequential phases, as described in more detail below.

In some configurations, the logic and control circuitry for one or more of the Voltage to Time circuit 154, the phaser circuit 156, and the phases 110, 120, and 130 are physically combined with or intermixed with or near one another.

Figure 2:
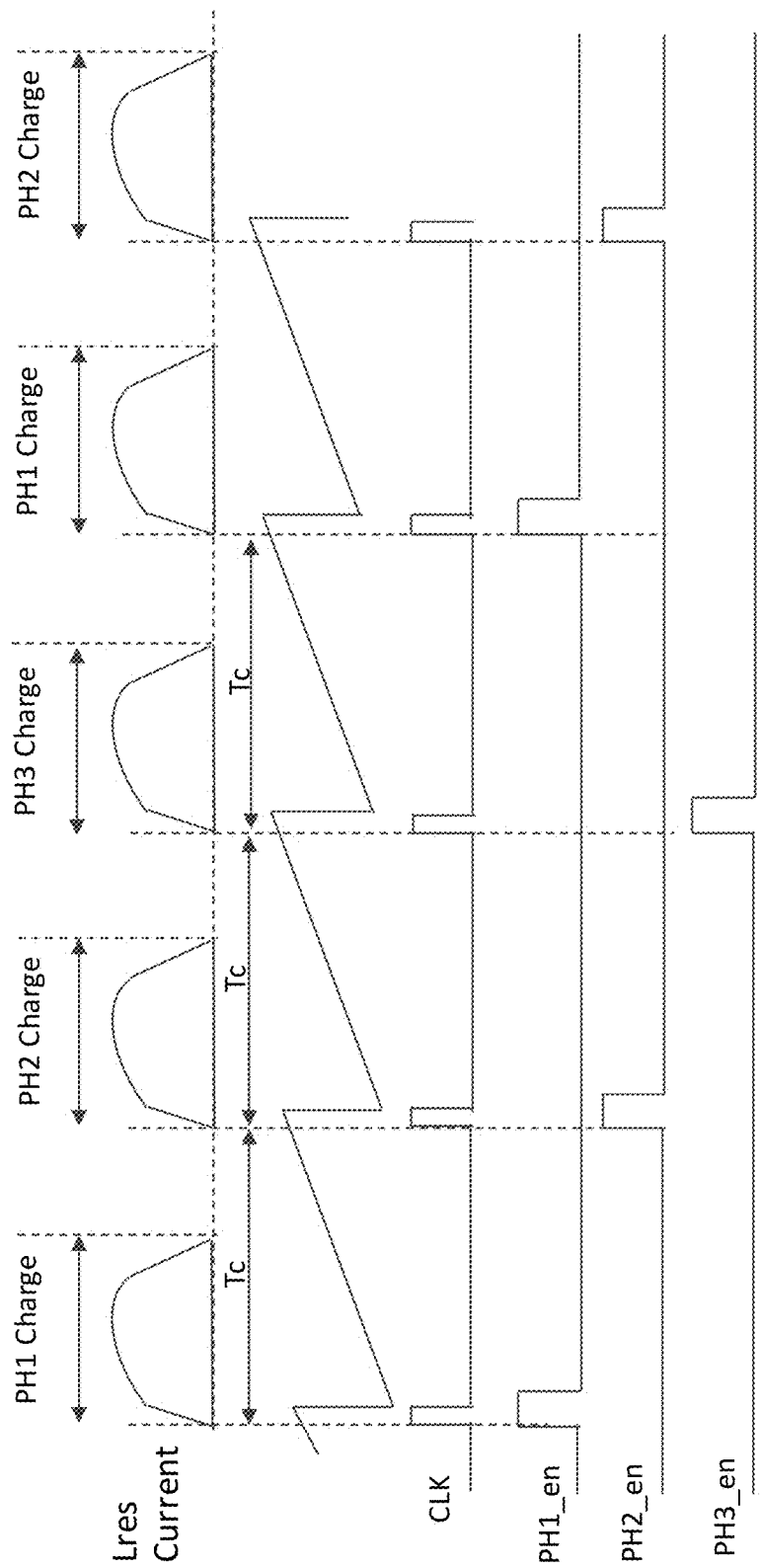
FIG. 2 is a waveform diagram illustrating wave forms for signals of the power delivery control circuit 100 illustrated in FIG. 1.

FIG. 2 is a waveform diagram illustrating wave forms for signals of the power delivery control circuit 100 illustrated in FIG. 1. Now referring to FIG. 2, the waveforms for the power delivery control circuit illustrated in FIG. 1 are illustrated for a light load condition. The first waveform is the inductor current (Lres Current), the second waveform is the inductor voltage, the third waveform is the clock pulse and the fourth, fifth and sixth are the trigger signals for triggering phase 1, phase 2 and phase 3, respectively.

As shown in FIG. 2, for the given load condition, the Voltage to Time Circuit has set the time between the starts of the phase charging times as Tc. The phaser circuit triggers phase 110 to execute one cycle which causes an amount of charge or current or energy to be delivered to the inductor of the illustrated LC filter. After the time Tc has expired, the Voltage to Time Circuit 154 sends a second pulse to the phaser circuit 156. In this case the phaser circuit 156 triggers phase 120 to execute one cycle which causes an amount of charge or current or energy to be delivered to the inductor of the illustrated LC filter. After the time Tc has expired, the Voltage to Time Circuit 154 sends a third pulse to the phaser circuit 156. In this case the phaser circuit 156 triggers phase 130 to execute one cycle which causes an amount of charge or current or energy to be delivered to the inductor of the illustrated LC filter.

In some embodiments, the amount of charge or current or energy delivered to the inductor by each of the phases 110, 120, and 130 may be controlled. For example, the amount of charge or current or energy may be controlled by design of the components of the power delivery control circuit 100, or may be controlled by controlling signals of the power delivery control circuit 100. For example, phaser circuit 156 may be configured to trigger phases 110, 120, and 130 by delivering pulses of variable widths, where the pulse width is controlled by a controller. Alternatively, each of phases 110, 120, and 130 may be configured to deliver a variable amount of charge or current or energy, where the amount is controlled by the controller. Other mechanisms of controlling the charge or current or energy delivered to the inductor by each of the phases 110, 120, 130 may additionally or alternatively be used.

After the time Tc has expired, the Voltage to Time Circuit 154 sends a fourth pulse to the phaser circuit 156. In this case the phaser circuit 156 triggers phase 110 to execute one cycle which essentially sends a controlled amount of energy to the connected inductor and out to the load. After the time Tc has expired, the Voltage to Time Circuit 154 sends a fifth pulse to the phaser circuit 156. In this case the phaser circuit 156 decides to trigger phase 120 to execute one cycle which essentially sends a controlled amount of energy to the connected inductor and out to the load.

In some embodiments the entirety of the power delivery control circuit illustrated in FIG. 1 can be disposed on a single monolithic die. In some embodiments the entirety of the power delivery control circuit illustrated in FIG. 1 can be disposed on a single monolithic die along with a load that can be a digital processor such as, but not limited to a central processing unit.

In some embodiments the power delivery control circuit 100 and/or phaser circuit 156 may have one or more of the following features:

Charge mode control, where the phaser circuit 156 is configured to arbitrate which phase to fire next. In some embodiments, the charge delivered to the inductor during each cycle is controlled. In some embodiments, the current delivered to the output capacitor and load starts at zero and returns to zero in response to each pulse from the Voltage to Time Circuit 154.

At light loads, the time between a phase being fired again can be large. During an 'off' time between firing of phases, the phase does not deliver current to the inductor, and as such can be considered 'off' or 'shed'. In other words, phase shedding can be an automatic by product of this control scheme.

This auto phase shedding can also allow for portions of the phase to be turned off while the phase is shed. For example, a bias current to the phase may be turned down or off to reduce power consumption and heat.

In some embodiments some of the features of the power delivery control circuit 100 are:

Time based control loop architecture.

Each time a phase is 'fired' or 'triggered' it delivers a 'quantity of charge' to the output.

The control loop determines 'Tc', the time between successive phase triggering. The smaller the 'Tc', the quicker the next phase gets fired. In other words, 'Tc' determines the rate at which 'quantities' of charge get delivered to the output.

A Control Timer circuit can be configured to monitor the output voltage and the commanded/desired voltage (DAC voltage) to calculate the precise 'Tc' required.

The Control Timer circuit can be digital, analog, or a combination thereof.

The power delivery control circuit can utilize digital technology, analog technology or a combination of digital and analog technologies. More specifically, in some embodiments signals such as, but not limited to, the error voltage and the output voltage can be analog signals or digitized signals. The timer can be a digital programmed timer or an analog timer that charges a capacitor. Similarly logic functions can be performed with digital data or analog comparators. Any combination of technologies can be employed and this disclosure is in no way limited to a particular digital or analog technology to perform any particular function.

Figure 3:
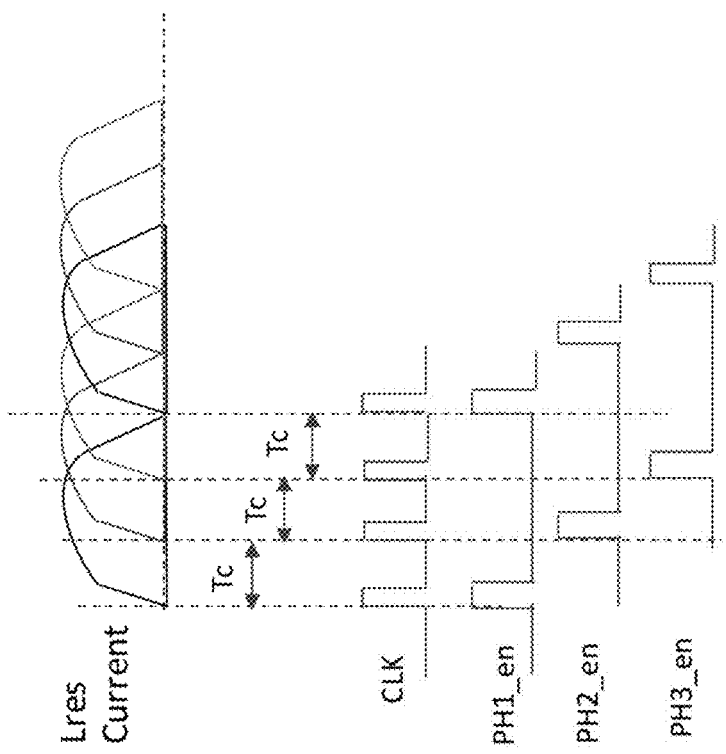
FIG. 3 is a waveform diagram illustrating wave forms for signals of the power delivery control circuit 100 illustrated in FIG. 1.

FIG. 3 is a waveform diagram illustrating wave forms for signals of the power delivery control circuit 100 illustrated in FIG. 1. Now referring to FIG. 3, high load waveforms are illustrated for the power delivery circuit shown in FIG. 1. As shown in FIG. 3, phase 110, phase 120 and phase 130 trigger pulses are much closer together such that a much higher average charge or current or energy is transferred to the load than for the low load case illustrated in FIG. 2. More specifically, the charge or current or energy delivered by each phase overlaps in time with the charge or current or energy delivered by each adjacent phase as shown by the Lres Current waveform.

Figure 4:
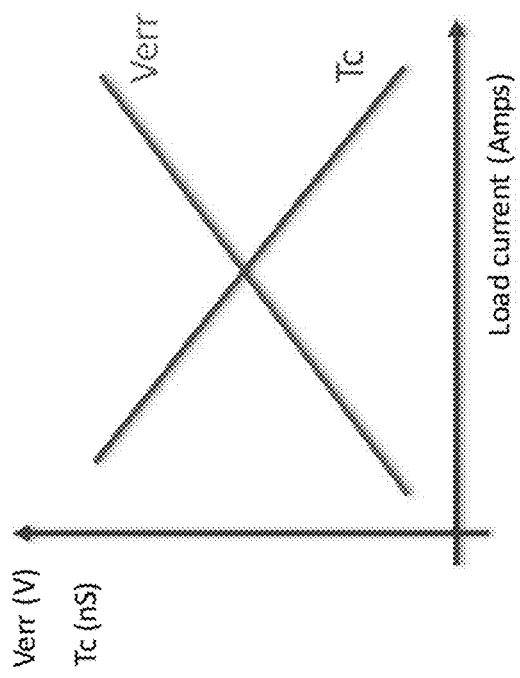
FIG. 4 is a diagram illustrating Tc (time between starts of phase pulses) and Verr (error voltage) dependence on load current.

FIG. 4 is a diagram illustrating an example embodiment of Tc and Verr dependence on load current. In alternative embodiments, the Tc and Verr dependence on load current has characteristics which are not illustrated in FIG. 4. For example, in some embodiments, the Tc and/or Verr dependence on load current is not linear. As shown in FIG. 4, as load current increases, Verr increases, and Tc reduces. In addition, as illustrated in FIG. 3, as load current increases, CLK pulses occur more frequently. At high enough load current conditions the output of the phases overlap to provide an increased output current and can seamlessly transition into continuous conduction mode (CCM) operation for delivering even higher current. In some embodiments a CCM circuit such as those disclosed in U.S. patent application Ser. No. 15/640,335 filed on Jun. 30, 2017 which is incorporated herein by reference in its entirety for all purposes, can be used with the power delivery control circuit 100.

Figure 5A:
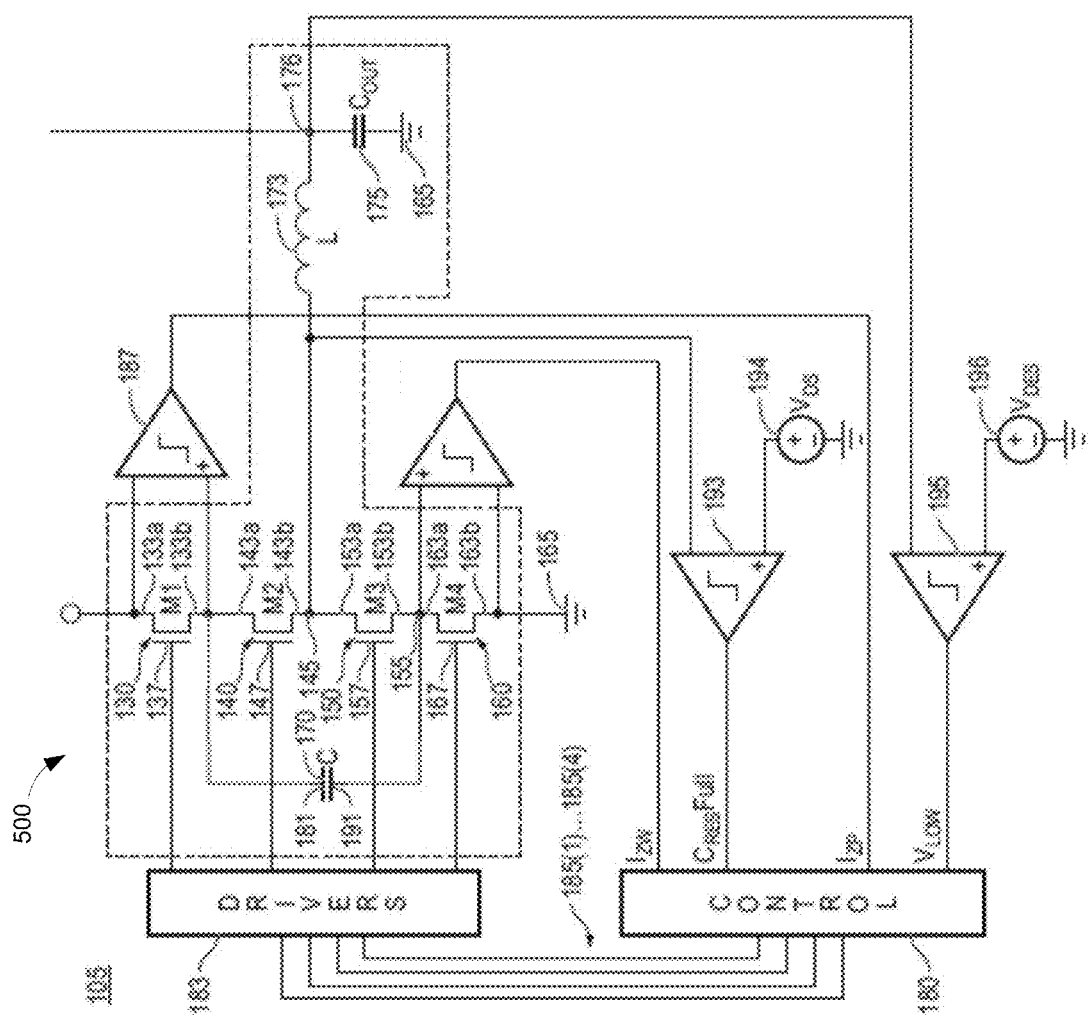
FIG. 5A is a schematic illustration of a power delivery engine.

FIG. 5A is a schematic illustration of a power delivery engine 500. In this embodiment, power delivery engine 500 comprises a power regulator circuit. Now referring to FIG. 5A a non-limiting example schematic of a power delivery engine 500 that can be used for each phase of the power delivery control circuit 100 illustrated in FIG. 1 is shown. In this example the power delivery engine 500 includes a plurality of sequentially coupled power switches M1, M2, M3, and M4.

Figure 5B:
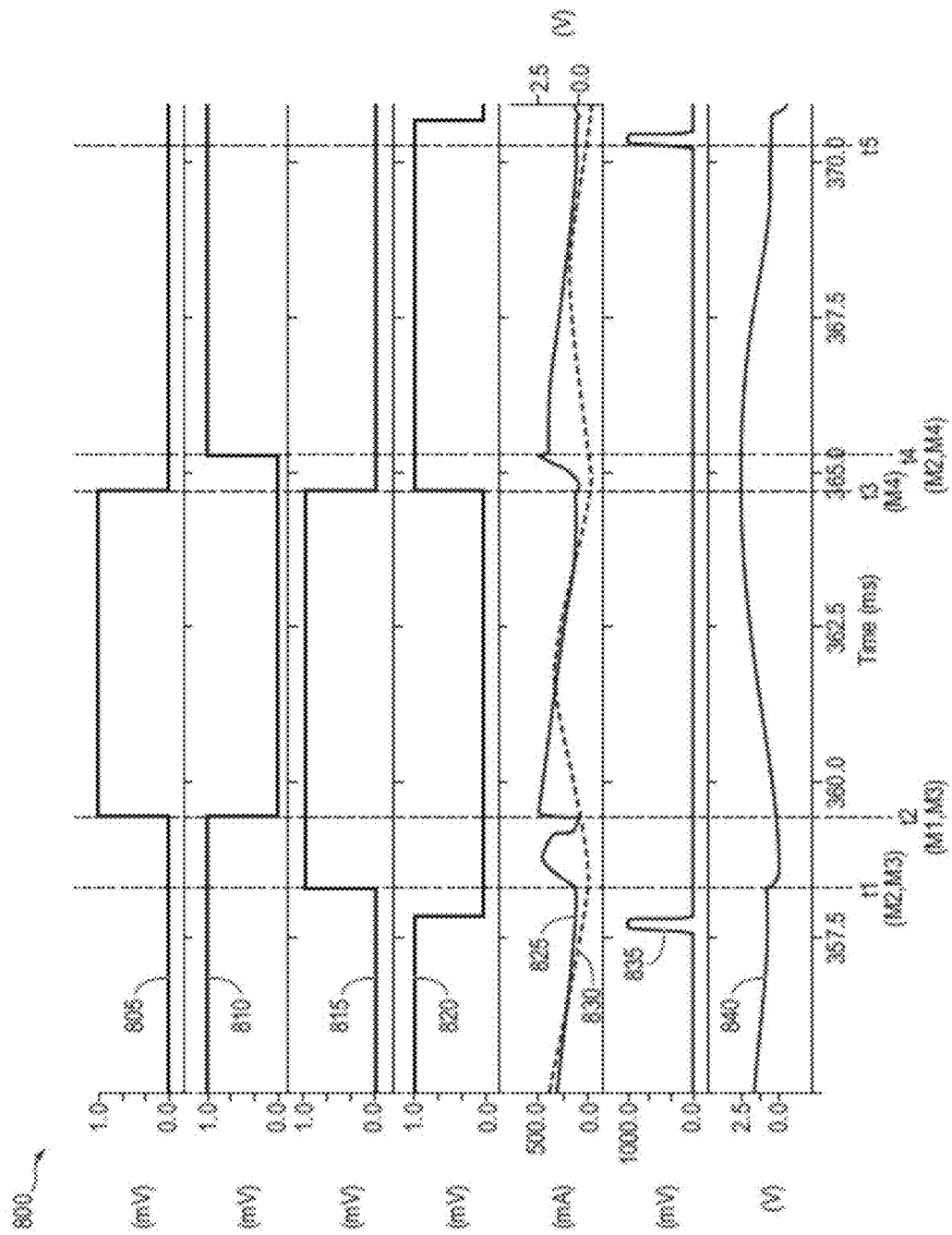
FIG. 5B illustrates one example of the waveforms for the power delivery engine 500 illustrated in FIG. 5A.

FIG. 5B illustrates one example of the waveforms for the power delivery engine 500 illustrated in FIG. 5A. These circuits and others are described in more detail in U.S. Pat. No. 9,300,210 issued on Mar. 29, 2016, which is incorporated by reference herein in its entirety for all purposes.

Trace 805 illustrates a control voltage applied to first solid-state switch 130. In the particular embodiment depicted, switches are turned on when approximately 1 volt is applied. At time t1 trace 805 is at approximately 0 volts thus first solid-state switch 130 is off. Trace 810 illustrates a control terminal voltage applied to second solid-state switch 140. At time t1 trace 810 is at approximately 1 volt thus second solid-state switch is on. Trace 815 illustrates a control terminal voltage applied to third solid-state switch 150. At time t1 trace 815 transitions to approximately 1 volt thus third solid-state switch 150 transitions from off to on. Trace 820 illustrates a control terminal voltage applied to fourth solid-state switch 160. At time t1 trace 820 is at approximately 0 volts thus fourth solid-state switch is off.

Trace 825 illustrates a voltage at second junction 145. At time t1, capacitor 170 is shorted. Trace 830 illustrates current through inductor 173. At time t1 inductor 173 is decoupled from the remainder of switched regulation circuit 125 thus the current in inductor 173 is zero. Trace 835 illustrates a comparator output corresponding to a zero current condition in inductor 173, as discussed in more detail below. Trace 840 illustrates the voltage across capacitor 170.

At time t1 capacitor 170 is shorted causing the voltage across capacitor 173 to decrease as the capacitor is discharged.

Figure 6:
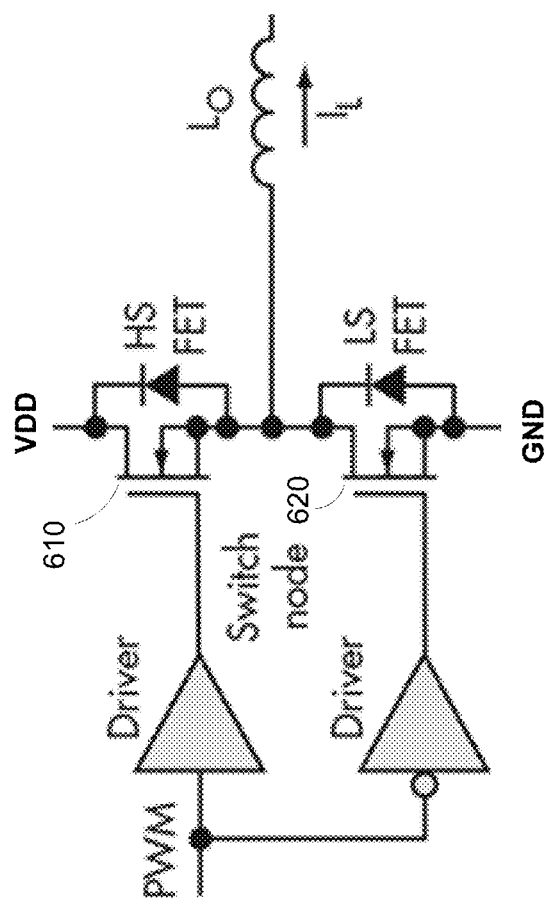
FIG. 6 is a schematic illustration of a power delivery engine.

Now referring to FIG. 6 a non-limiting example schematic of a power delivery engine 600 that can be used in each phase of the circuit 100 illustrated in FIG. 1 is shown. In this example the power delivery engine 600 includes a two coupled power switches 610 and 620 arranged in a synchronous buck converter configuration, as known in the art. Other embodiments can have different power delivery engines including, but not limited to full bridge, buck, boost, buck boost, and other types of power control circuits known by one of skill in the art.

Figure 7:
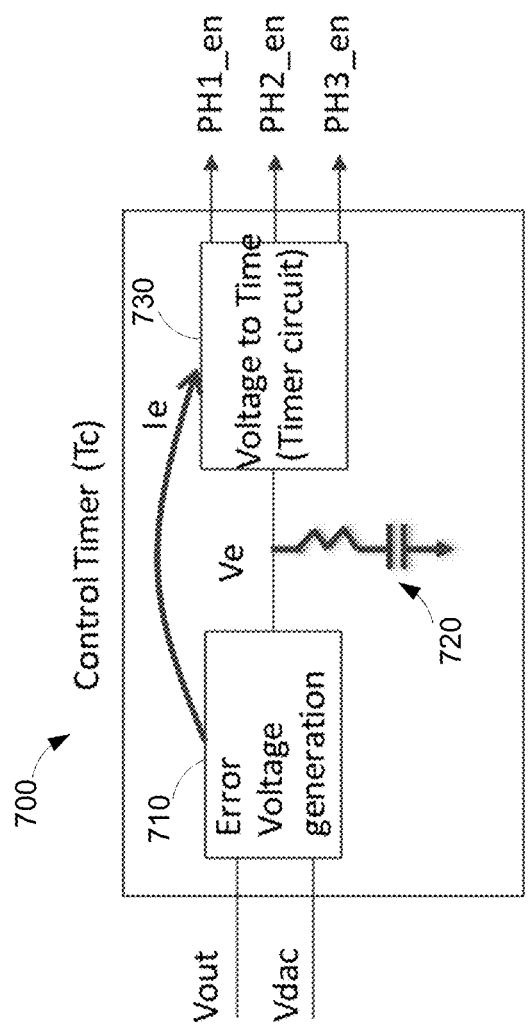
FIG. 7 is a schematic illustration of a control timer circuit.

Now referring to FIG. 7 a transient performance boost circuit 700 is shown that can be used instead of control circuit 150 in the power delivery control circuit 100 illustrated in FIG. 1. In some embodiments the transient performance boost circuit 700 can include one or more of the following features:

For fast transient response, the error voltage generation 710 can incorporate multiple enhancement schemes.

One such scheme temporarily increases the GM of an error amplifier in the Error Voltage generation 710. The increase in GM helps the control voltage "Ve" quickly ramp up or down in response to the error voltage seen at the input (Vout-Vdac).

Another scheme employs a feed forward signal (Ie) supplied from the error amplifier and delivered to the timer such that during a transient an error current bypasses the compensation network 720 and quickly changes the timer circuit 730 output (Increases or decreases the frequency of phase firing).

Another scheme employs a fixed offset in the timer circuit 730. Detecting a transient, the offset can be either increased or decreased instantly such that the frequency change is instant giving a rapid response.

Another scheme employs multiple bands of frequency of operation. Timer circuit 730 is configured to generate a range of output frequencies corresponding with the functional range of control voltage (Ve). In a multiple frequency band scheme, timer circuit 730 is programmable so as to generate a different range of output frequencies for each frequency band. Accordingly, when using a multiple frequency band scheme, the frequency generated by timer circuit 730 is determined based on both the control voltage (Ve) and the programmed frequency band. Control of the output frequency is achieved through a combination of response to error voltage for fine control and frequency band selection for coarse control.

During transient conditions, bands can be hopped (band hopping) up or down to quickly achieve the desired operating frequency. For example, in response to the control voltage (Ve) saturating, by being driven outside its functional range, timer circuit 730 may be programmed by a controller to operate in an appropriate adjacent higher or lower frequency band. Alternatively or additionally, timer circuit 730 may be programmed by a controller to operate in a higher or lower frequency band in response to the control voltage (Ve) increasing or decreasing at a rate greater than a threshold.

In some embodiments bump type sequencing of each phase can be used when a plurality of serially coupled power devices are used, for example, as described in application Ser. No. 15/640,335 filed on Jun. 30, 2017 and U.S. Pat. No. 9,300,210 issued on Mar. 29, 2016, which are incorporated herein in their entirety by reference. The bump type sequencing can include one or more of the following features:

- Each phase can deliver two types of "Bumps" or charge delivery sequences, named VDD bump and GND bump, a VDD bump caused by current sourced from or sunk by the VDD power supply being sunk by or sourced from the connected inductor, and a GND bump caused by current sourced from or sunk by the connected inductor being sunk by or sourced from the GND power supply.
- The phases may collectively deliver these two bumps strictly in alternate sequence. VDD=>GND=>VDD=>GND and so on. For example, this may occur by each of the phases delivering alternating bumps (VDD=>GND=>VDD=>GND and so on.)
- In some embodiments, an alternative bump sequence may be preferred.
- For example, a VDD bump may excite the supply network more than a GND bump. Therefore, the phases in a multiphase system may collectively deliver more GND bumps than VDD bumps.
- In some systems, a frequency of the VDD bumps and/or the GND bumps may be controlled through selection of a VDD/GND bump sequence.
- In some embodiments the phase firings can be sequenced to achieve an arbitrary bump sequence. For instance a 3 phase system can deliver VDD=>VDD=>VDD=>GND=>GND=>GND sequence. Or it can also deliver VDD=>GND=>VDD=>GND=>VDD=>GND sequence. The bump sequence used can affect the frequency at which the input network is excited.
- Depending on the input impedance network, an optimal choice of bump sequence can be programmed to achieve the optimal supply noise characteristics.
- The power supply switching frequency can be kept away from the input network resonant frequency (or where the input impedance is large).
- This feature can also help during transient response at least because the current load on the power supplies are distributed in time. As a result, the bypass capacitance and low power bus impedance are sufficient to prevent unacceptable power supply transients. Therefore, the voltage difference between the positive and negative power supplies remains substantially fixed.
- In some embodiments, the bump sequence of each of the phases is controlled using methods discussed in application Ser. No. 15/640,335 filed on Jun. 30, 2017 and U.S. Pat. No. 9,300,210 issued on Mar. 29, 2016, referenced above. To coordinate a collective bump sequence collectively generated by the multiple phases, a controller receives or determines a target collective bump sequence, and determines a bump sequence for each of the phases. The controller provides signals for each of the individual phases so as to cause each of the individual phases to operate with the bump sequence determined therefor by the controller. Accordingly, each of the individual phases operate with the bump sequence determined therefor, and the collective bump sequence generated by the multiple phases corresponds with the target collective bump sequence.

Figure 8:
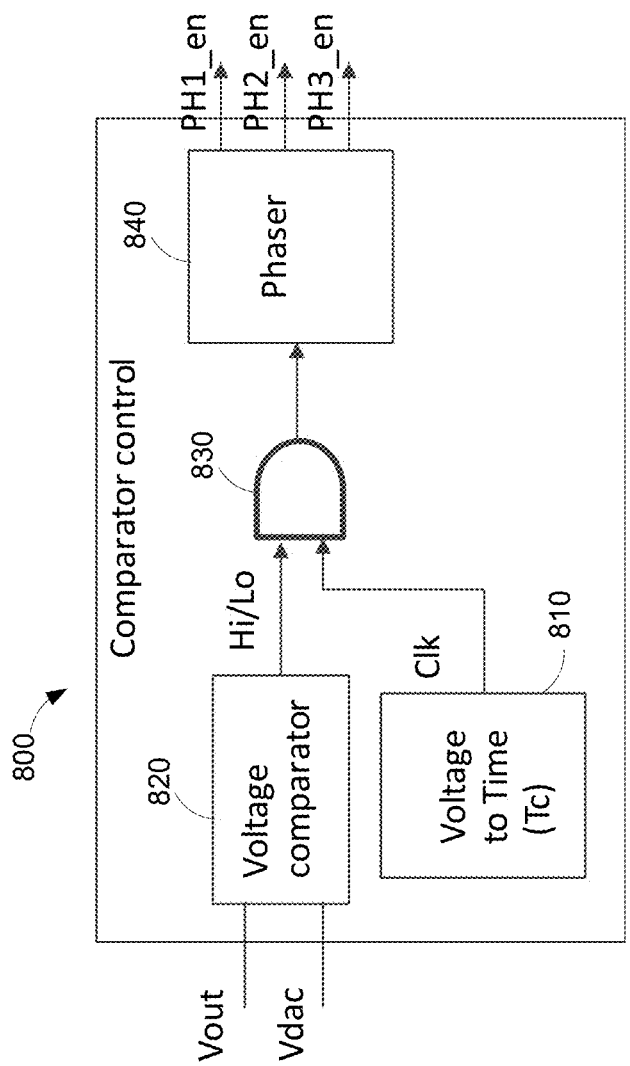
FIG. 8 is a schematic illustration of a comparator mode control circuit.

Now referring to FIG. 8, a comparator mode control circuit 800 can be used instead of control circuit 150 in the power delivery control circuit 100 illustrated in FIG. 1. The comparator mode control circuit 800 can combine the output of the timer 810 with the output of a comparator 820 so the decision to trigger the next phase includes the following conditions: 1) has the timer expired? and 2) is the output voltage below a threshold voltage? Both of these conditions must be true for the next phase to trigger. This feature can be particularly useful for semiconductor processes where a timer with a wide time range is difficult to make so at light loads the comparator can be relied upon such that the next phase will only be triggered if the output voltage goes below a threshold voltage. In some embodiments the comparator mode control can have one or more of the following features:

- Comparator mode control circuit 800 may be used in addition to one or more other control schemes. For example, comparative mode control circuit 800 and control circuit 150 may both be used. Which control circuit is active can be determined, for example, based on load conditions. For example, comparative mode control circuit 800 may be used when the load is less than a threshold.
- Band hopping along with a comparator can be used to provide a fast transient response.
- The comparator mode control is also useful during Start up, Dynamic Voltage Scaling (DVS) Up and DVS Down. In comparator mode overshoot and undershoot is minimized based on the state of the comparator output.
- In some embodiments, the comparator 820 is hysteretic.
- In some embodiments a comparator control circuit can be included as a portion of the phaser circuit. More specifically, a comparator control circuit can use Vout and the clock signal to only allow the phaser to execute a phase if Vout is below a predetermined voltage and a clock signal is received from the Voltage to Time circuit. This feature can protect against the phaser sending trigger signals to one or more phases if Vout is above the predetermined voltage but due to transients or bandwidth limitations of the control circuit one or more clock signals are sent. Because Vout is above the predetermined voltage no phases will be triggered.

In some embodiments any logical combination of Vout and the timer output can be used as an input to the phaser. In various embodiments the comparator control circuit can be implemented via analog circuitry, digital circuitry or a combination thereof. In one example, the output voltage can be digitized, the timer can be digital and a digital processor can be used to make a logical decision whether or not to transmit a pulse to the phaser.

Figure 10:
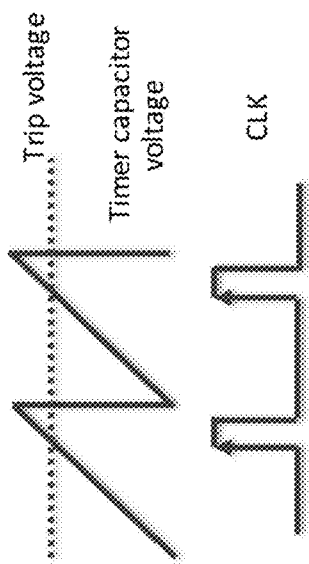
FIGS. 9 and 10 illustrate an embodiment of a voltage to time circuit.
Figure 9:
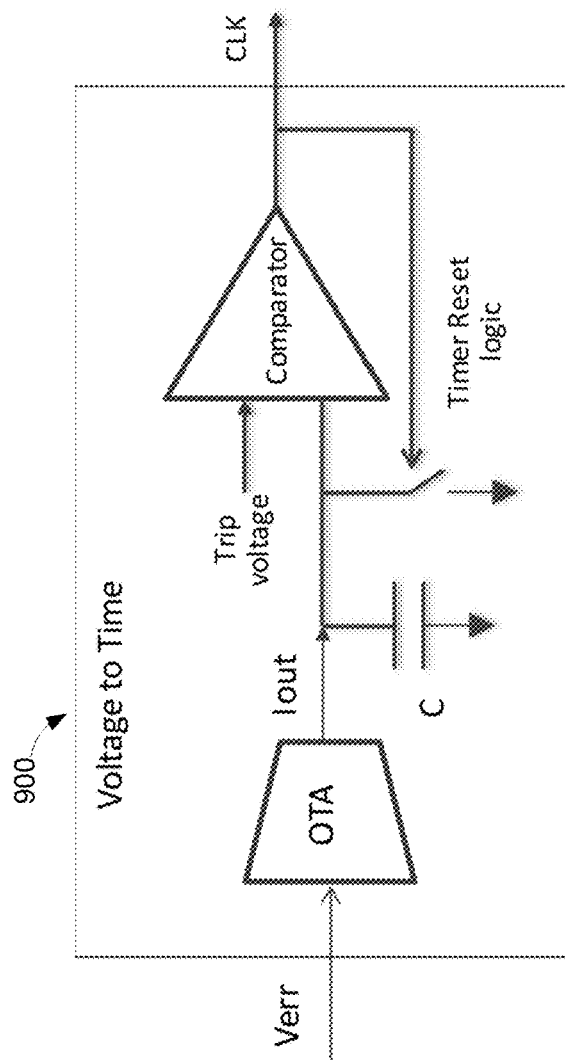
Figure 12:
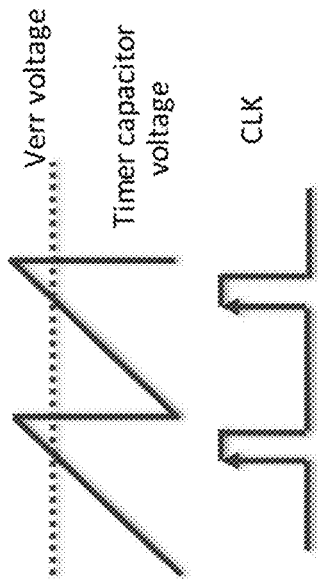
FIGS. 11 and 12 illustrate an embodiment of a voltage to time circuit.
Figure 11:
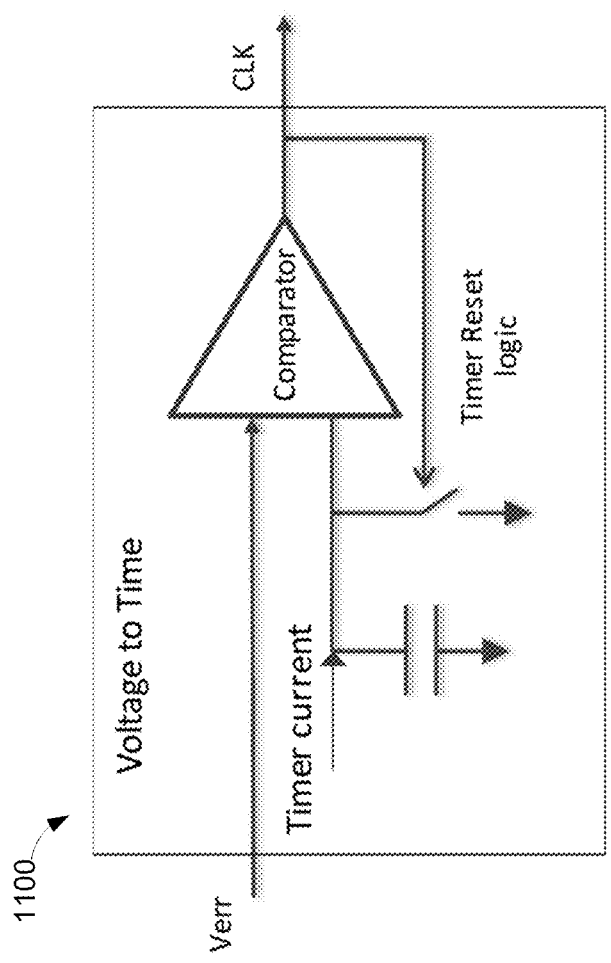

Now referring to FIGS. 9 and 10, an embodiment of a voltage to time circuit 900 is illustrated. Voltage to time circuit 900 can be used with the power delivery control circuit shown in FIG. 1. In some embodiments the voltage to time circuit 900 can have one or more of the following features:

- The trip voltage can be dynamically changed to get faster response during a transient. For example, during a loading transient, trip voltage can be decreased.
- For DVS up transition, trip voltage can be decreased while for a DVS down transition, trip voltage can be increased.
- The capacitance of capacitor C can be changed to increase or decrease the clock output frequency FIGS. 11 and 12 illustrate an embodiment of a voltage to time circuit. Now referring to FIGS. 11 and 12, an embodiment of a voltage to time circuit 1100 is illustrated. Voltage to time circuit 1100 can be used with the power delivery circuit shown in FIG. 1. In some embodiments the voltage to time circuit can have one or more of the following features:

Timer current can be programmable to give control on the clock frequency range.

Timer current can be dynamically changed to improve transient response, for example, during loading transient, the timer current can be increased to generate faster clock frequency.

During DVS up, timer current can be increased.

The capacitance of capacitor C can be changed to increase or decrease the clock output frequency.

Figure 14:
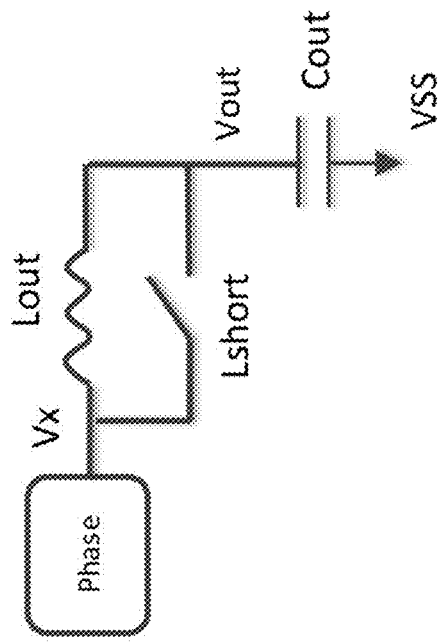
FIGS. 13 and 14 illustrate an embodiment of inductor shorting.
Figure 13:
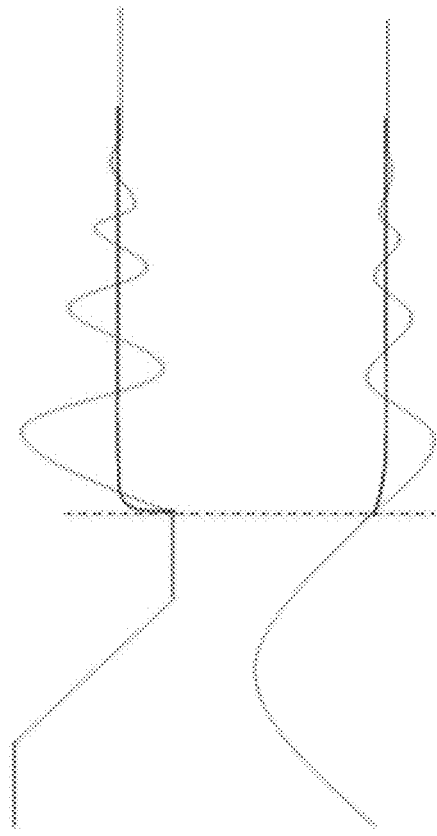

FIGS. 13 and 14 illustrate an embodiment of inductor shorting circuit Lshort. In this embodiment inductor shorting circuit Lshort is a switch. Now referring to FIGS. 13 and 14, in some embodiments inductor shorting can be used to improve linearity of the power delivery circuit shown in FIG. 1. Inductor shorting can include one or more of the following features:

During discontinuous current mode (DCM) operation, the phase circuit of FIG. 13 presents a high impedance to the switching node Vx. As a result, the voltage at switching node Vx and the current through the inductor can ring based on the capacitances, resistances, and inductances of the circuit according to principles understood by those of skill in the art. The ringing may not be desired in some embodiments since it leaves the starting current in the inductor at the beginning of the next cycle, when switching node Vx is again driven by the phase, in an uncontrolled state. The uncontrolled state is at least partially influenced by previous data, such that the uncontrolled state causes non-linearity.

An inductor shorting circuit Lshort can be used such that while the inductor is not driven by the phase, the switching node Vx and the output Vout are shorted.

The shorting causes the inductor current to be equal or substantially equal to zero. This allows for the next cycle of that phase, when switching node Vx is again driven by the phase, to begin with a controlled and/or consistent zero or substantially zero or near zero current instead of starting in the uncontrolled state, which may be either a positive or a negative current.

To short the inductor, inductor shorting circuit Lshort becomes conductive while the phase connected thereto is in a high impedance state (for example, as is common to multiple parallel coupled FETS and Buck architectures). Inductor shorting circuit Lshort may remain on for a small predetermined amount of time or may stay on until just before the phase is fired again.

The inductor shorting circuit Lshort shorts the output inductor and provides a low impedance path for charging the parasitic capacitance at switching node Vx to the voltage at node Vout.

Because Lout and Cout form an LC oscillator, without the inductor shorting circuit Lshort, the parasitic node may ring undesirably.

In another embodiment, the inductor shorting circuit Lshort can electrically short the switching node Vx to another voltage source (Supply for example) for a brief amount of time to charge the switching node Vx to the supply voltage, after which the inductor shorting circuit Lshort may be opened. By charging the switching Vx node to the supply voltage, the ringing may be greatly reduced and/or may be controlled such that the next cycle of the phase, when switching node Vx is again driven by the phase, begins with a consistent current instead of starting in the uncontrolled state.

Now referring to FIG. 7 a transient performance boost circuit 700 is shown that can be used instead of control circuit 150 in the power delivery control circuit 100 illustrated in FIG. 1. In some embodiments the transient performance boost circuit 700 can include one or more of the following features as described below in FIG. 15 section.

Figure 15:
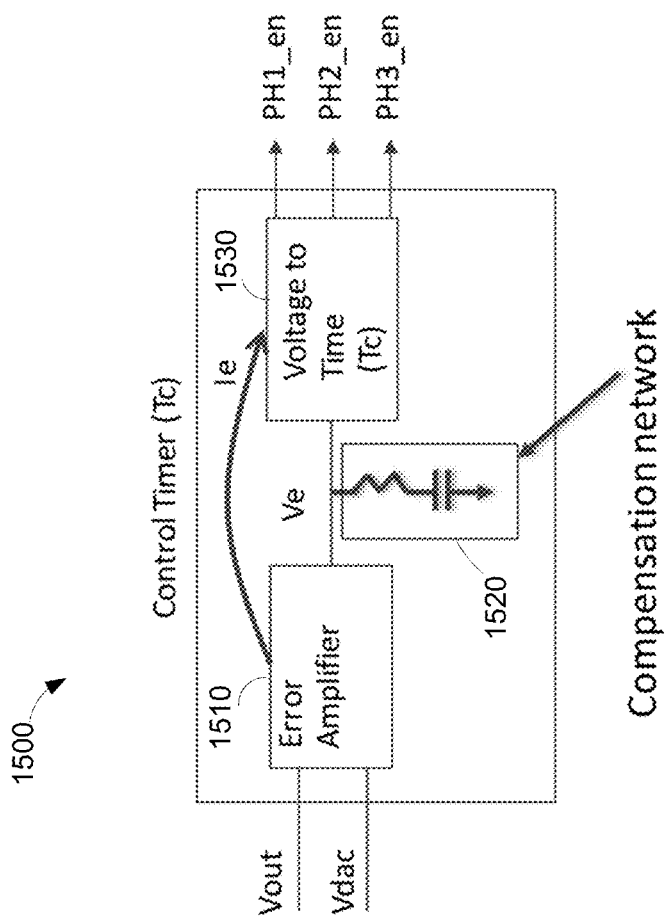
FIG. 15 is a schematic illustration of a control timer circuit.
Figure 16:
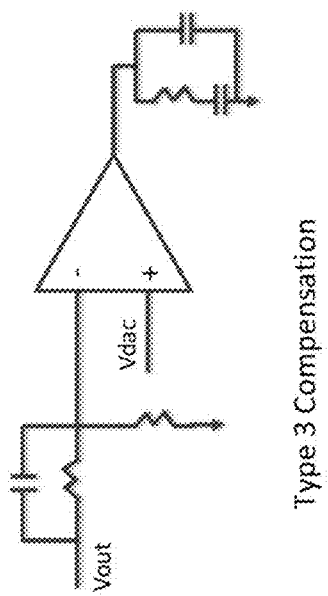
FIGS. 16-18 are schematic illustrations of compensation networks according to some embodiments.
Figure 17:
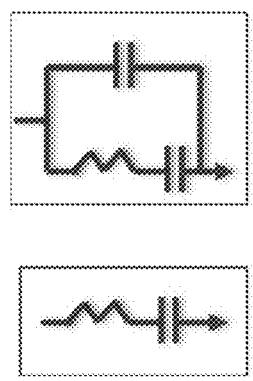
Figure 18:
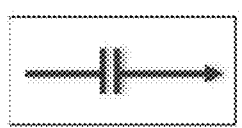

FIG. 15 is a schematic illustration of a control timer circuit 1500. Now referring to FIG. 15, a control timer 1500 is shown that can be used instead of control circuit 150 in the power delivery control circuit 100 illustrated in FIG. 1. In this embodiment, a compensation network 1520 is coupled between the Error Amplifier 1510 and the Voltage to Time circuit 1530. In various embodiments the compensation network 1520 is used to improve the stability of the Verr signal to make the feedback loop more stable and reliable. In one example embodiment the compensation network 1520 can include a capacitor to ground as shown. In further embodiments, illustrated in FIGS. 16, 17 and 18, the compensation network can include a Type 3, a Type 2 or a Type 1 compensation circuit, respectively, as known by those of skill in the art. Other compensation networks can also be used and this disclosure is in no way limited to the disclosed example compensation networks. For example, as illustrated in FIG. 15, another scheme employs a feed forward signal (Ie) from the error amplifier 1510 to the timer 1530 such that during a transient an error current bypasses the compensation network and quickly changes the timer output (e.g., increases or decreases the frequency of phase firing).

In some embodiments one or more telemetry features can be implemented for the power delivery control circuitry 100 illustrated in FIG. 1. For example, in one embodiment telemetry circuitry can be configured to record digital or analog data from the power delivery and control circuitry that corresponds to the current output, voltage output or other characteristic of the power delivery and control circuitry. In some embodiments the power delivery and control circuitry 100 can be used in conjunction with an integrated circuit that includes a processor wherein the processor can be commanded to record the telemetry data and store the telemetry data in an associated memory. In various embodiments the telemetry data can be recorded only when commanded, or in other embodiments it can be recorded continually, for example when used in conjunction with a FIFO memory.

In some embodiments the telemetry circuitry can acquire data associated with the current output of the power delivery and control circuitry 100 by recording data representing the Verr signal generated by the Error Amplifier 152 since the Verr signal can be correlated to the output current. In other embodiments the telemetry circuitry can acquire data corresponding to the frequency of the clock pulses sent by the Voltage to Time (Tc) circuit 154 which can also be correlated with the output current. The accuracy of the telemetry data and how precisely it is correlated to the actual current delivered by the power delivery and control circuitry can be affected by how well controlled and/or known the characteristics of the components of the power delivery and control circuitry are. For example, the specific values of the capacitors, inductors and resistors can affect the accuracy of the data, therefore to improve the accuracy the tolerance on such components can be either highly controlled and/or the components can be characterized and the system can be trimmed to compensate for the characteristics, thereby improving the accuracy.

For simplicity, various peripheral electrical components are not shown in the figures.

Regulator with Continuous Current

In some embodiments power delivery control circuit 100 (see FIG. 1) can be configured to provide continuous current and/or an increase in current to the load by continuously maintaining the current in the inductor of at least one of the phases 110, 120, 130 above zero, as described in more detail below.

Figure 19:
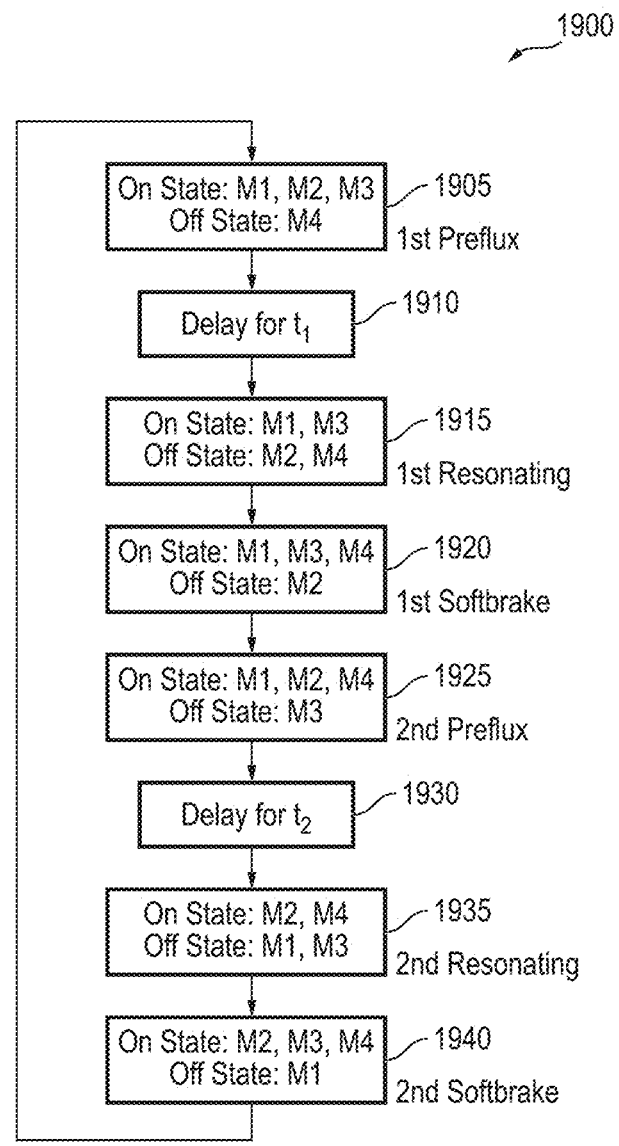
FIG. 19 is a flowchart of a repetitive switching sequence providing a continuous current output for the switched regulation circuit in FIG. 5A according to an embodiment of the invention.
Figure 20:
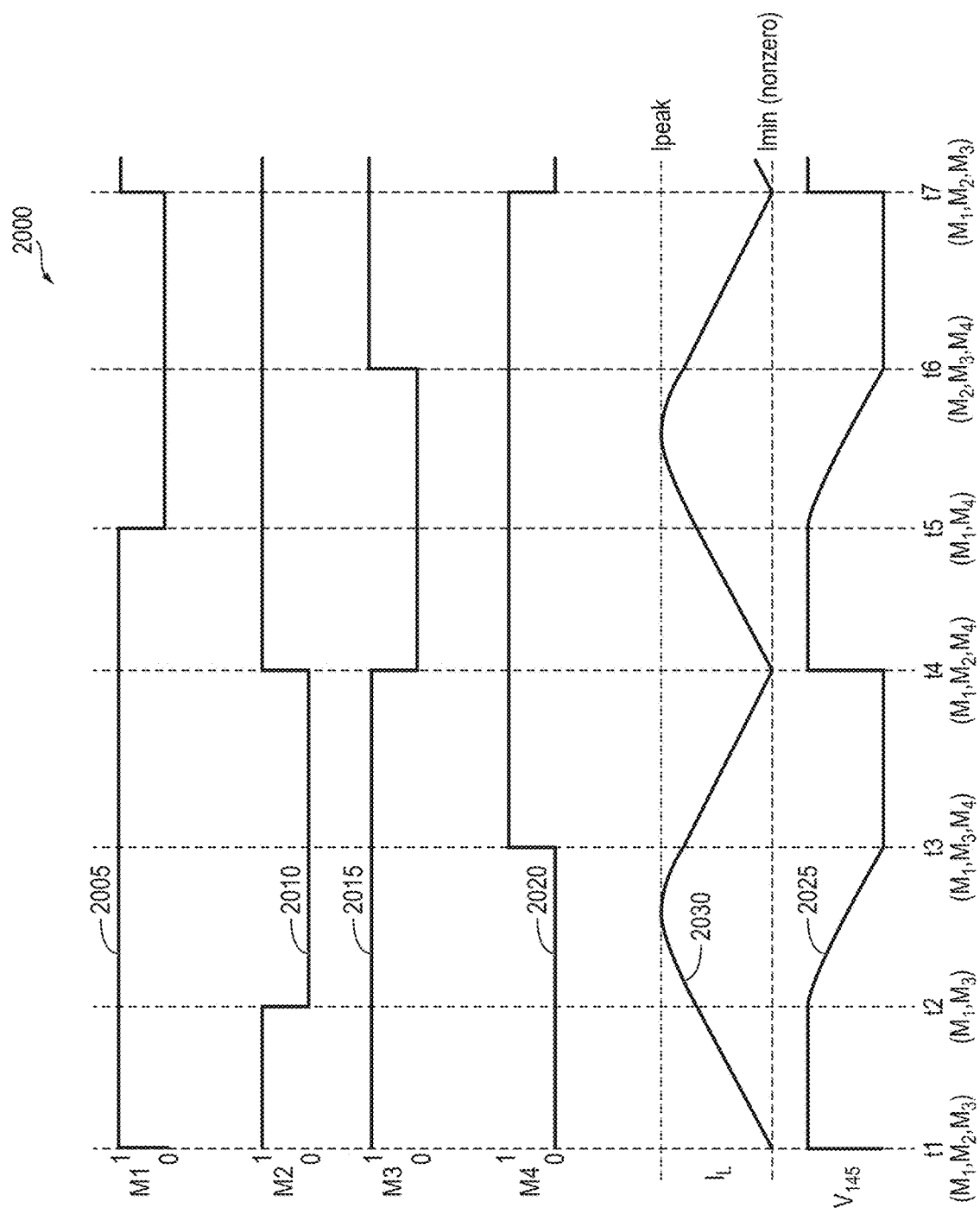
FIG. 20 is a timing diagram of voltages and currents within the switched regulation circuit of FIG. 5A according to the switching sequence in FIG. 19.

Now referring simultaneously to FIG. 5A, and FIGS. 19-26 an example switching sequence and timing diagram for an embodiment of switched regulation circuit 125 (see FIG. 5A) with continuous and/or increased current is illustrated. More specifically, FIG. 5A illustrates a simplified schematic of switched regulation circuit 125; FIG. 19 illustrates an example switching sequence 1900 having sequential steps 1905 through 1940 for the four switches in switched regulation circuit 125; FIG. 20 illustrates an example timing diagram showing the control signals delivered to each of the four solid-state switches as well as the current within inductor 173 (IL), and the voltage at second junction 145 (V145) during switching sequence 1900; and FIGS. 21-26 illustrate simplified circuit schematics of each of the six different solid-state switch configurations described in switching sequence 1900. In FIGS. 21-26 solid-state switches that are in an on state are depicted with solid lines and solid-state switches that are in an off state are depicted with dashed lines. The switching sequence illustrated in FIG. 19 is for example only and other switching sequences, timings and configurations are within the scope of this disclosure.

Figure 21:
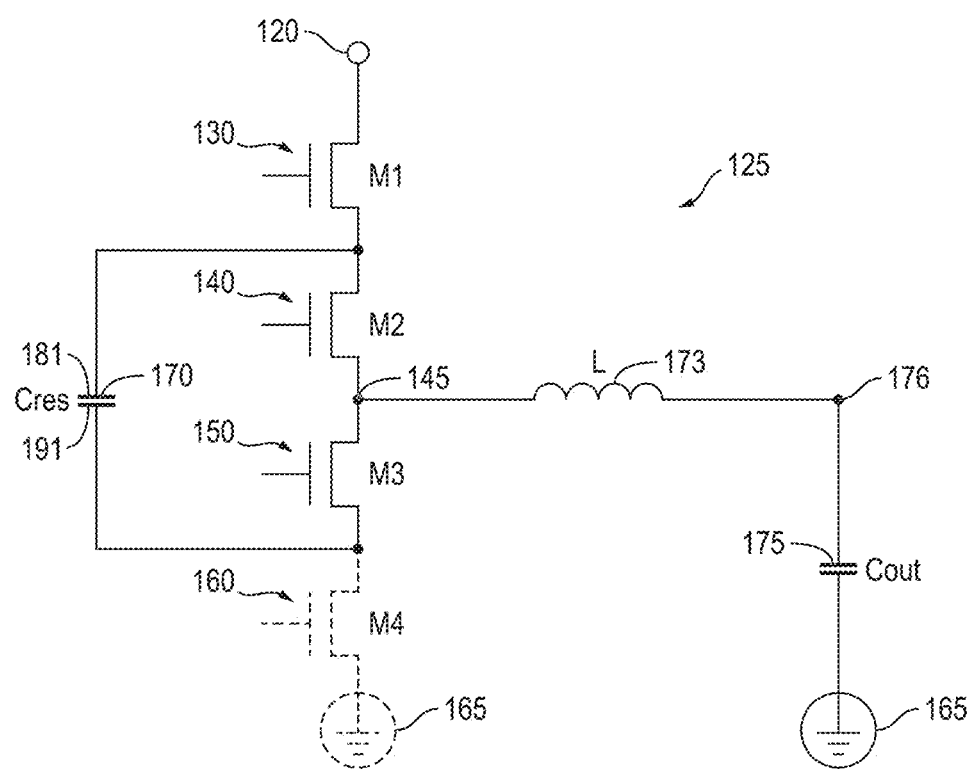
FIG. 21 is a schematic of the switched regulation circuit shown in FIG. 5A in a particular switch configuration according to the switching sequence in FIG. 19.

Now referring to FIG. 19, switching sequence 1900 having sequential steps 1905 through 1940 is illustrated. In step 1905, first, second and third solid-state switches M1, M2 and M3, respectively, are controlled to be in an on state and fourth solid-state switch M4 is controlled to be in an off state. A simplified schematic of switched regulation circuit 125 in step 1905 is illustrated in FIG. 21. Step 1905 is a first inductor prefluxing state where current in inductor 173 (see FIG. 5A) is increased at a substantially linear rate by the application of the input voltage at first terminal 120 (Vin) across the inductor, at a time before capacitor 170 is charged.

Example currents and voltages within switched regulation circuit 125 for step 1905 are illustrated in timing diagram 2000 (see FIG. 20). The logic levels for solid-state switch control signals M1, M2, M3, M4 are indicated by traces 2005, 2010, 2015 and 2020, respectively. A high logic level (sometimes noted as 1) indicates the switch (or composite switch) is in an on state, and a low logic level (sometimes noted as 0) indicates the switch is in an off state.

Timing diagram 2000 illustrates that first step 1905 occurs at time t1. At time t1, trace 2005 shows that a high logic level control signal is applied to first solid-state switch 130, placing it in an on state. Trace 2010 illustrates that at time t1 a high logic level control signal is applied to second solid-state switch 140, placing it in an on state. Trace 2015 illustrates that at time t1 a high logic level control signal is applied to third solid-state switch 150, placing it in an on state. Trace 2020 illustrates that at time t1 a low logic level control signal is applied to fourth solid-state switch 160, placing it in an off state.

Continuing to refer to timing diagram 2000, at t1 a voltage at second junction 145 (see FIG. 5A) is illustrated by trace 2025 and is substantially equivalent to the Vin voltage (minus a relatively small voltage drop across M1 and M2) at first node 120. Current in inductor 170 (IL trace 2030) increases rapidly, corresponding to the applied voltage and the characteristics of inductor 173. For some embodiments, the voltage at node 176 (see FIG. 5A) may change a relatively small amount compared with the voltage across the inductor and thus the current may increase substantially linear at a rate approximated by (Vin−Vout)/L where Vout is the voltage at node 176. The current in inductor 173 continues to increase while in this switch state, the duration of which may be controlled by a timer, shown in step 1910 as a delay.

In some embodiments the timer in step 1910 can be fixed while in other embodiments it can be a variable timer. In one example the variable timer can use a lookup table to adjust according to different load conditions and demands on switched regulation circuit 125. More specifically, in some embodiments the timer can be set proportional to a "duty factor" (e.g., Vout/Vin) such that a longer amount of time is selected when a higher Vout is required. In further embodiments the timer in step 1910 can be controlled by a feedback loop based on one or more characteristics of switched regulation circuit 125. In some embodiments the timer may be adjusted by the feedback loop to energize inductor 173 with an appropriate amount of current so that the inductor current resonates to a predetermined current when the first resonating state is engaged (discussed in the next step 1915). In further embodiments the timer can use a comparator that compares the current in the inductor to a programmable current threshold.

In other embodiments, the timer can be made utilizing a current on a capacitor wherein the current starts charging at the beginning of the preflux cycle and may be compared to a predetermined voltage. When the voltage on the capacitor reaches a specified voltage the timer indicates that the preflux cycle should end. In other embodiments the timer function can be performed utilizing logic gates.

In some embodiments, instead of a timer for setting the amount of preflux, the current in the inductor can be monitored during preflux (e.g., step 1905) and the preflux cycle can be set to end when the current reaches a specified level. That specified current level can be adjusted on a cycle by cycle basis to optimize performance. Other timer techniques and timer architectures can be used and are within the scope of this disclosure.

Figure 22:
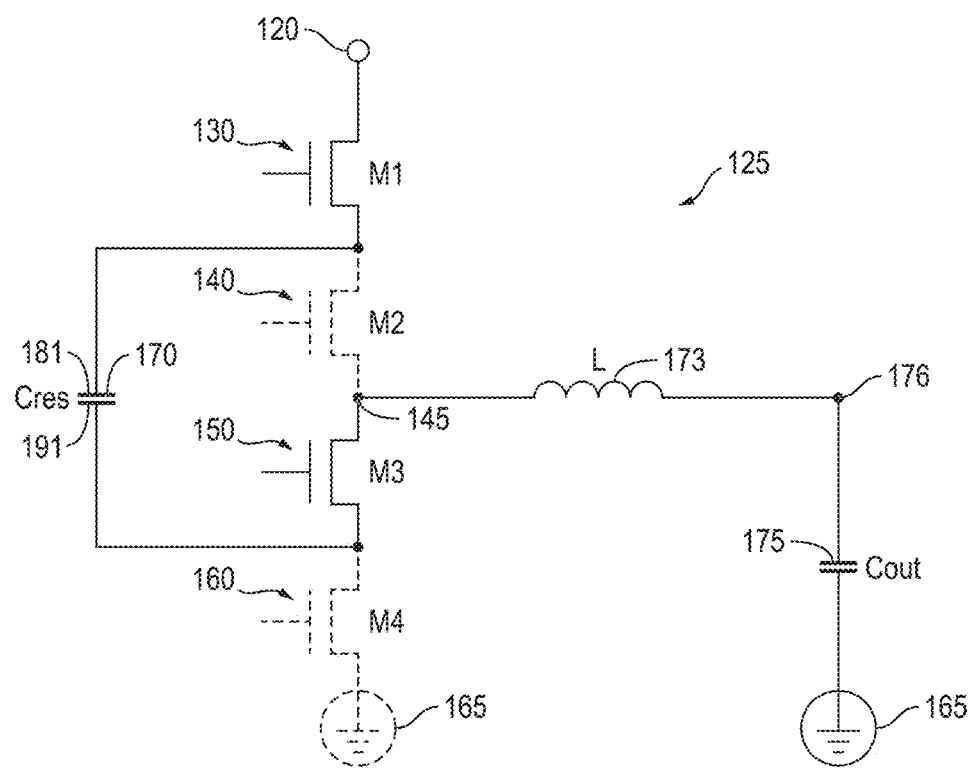
FIG. 22 is a schematic of the switched regulation circuit shown in FIG. 5A in a particular switch configuration according to the switching sequence in FIG. 19.

Now referring to FIG. 19, after the delay in step 1910, the controller advances to step 1915 where first and third solid-state switches M1 and M3 remain on while the second solid-state switch M2 is turned off and the fourth solid-state switch M4 remains off. Thus, first and third solid-state switches, M1, M3, respectively, are on while second and fourth solid-state switches M2, M4, respectively, are off. A simplified schematic of switched regulation circuit 125 in step 1915 is illustrated in FIG. 22. This state couples capacitor 170 in series with inductor 173 and the voltage at first terminal 120 (Vin) is applied directly to second junction 145. Capacitor 170 now begins to charge. Capacitor 170 charges with a time constant set by capacitor 170 and inductor 173 values. Further, as capacitor 170 begins to charge, current flow in inductor 173 continues to increase as the voltage between second junction 145 and the output is positive. Because of the prefluxing operation in step 1905, the current that was already flowing in inductor 173 continues to increase, as discussed in more detail below.

Step 1915 is illustrated in timing diagram 2000 (see FIG. 20) at time t2. Now referring simultaneously to FIGS. 5A and 20, at time t2, second solid-state switch 140 (i.e., trace 2010) turns off. The voltage at second junction 145 (i.e., trace 2025) begins to decrease. Current in inductor 173 (trace 2030) continues to build as capacitor 170 charges.

Voltage in capacitor 170 increases towards Vin. As capacitor 170 becomes charged the current in inductor 173 (trace 2030) peaks, then begins to decrease when the voltage at node 145 equals the voltage at node 176 and continues to decrease towards time t3. Thus, in step 1915, capacitor 170 charges, causing a current to flow in inductor 173, and increasing the voltage at output node 176 (Vout). When capacitor 170 is fully charged to the voltage at (Vin) 120, the controller proceeds to step 1920 (see FIG. 19) which is a first "soft braking" configuration that can be used to transition the current remaining in inductor 173. Soft braking can enable a higher current per phase and/or a smaller capacitor 170 per phase as compared to the methodologies discussed above and as explained in more detail below.

Figure 23:
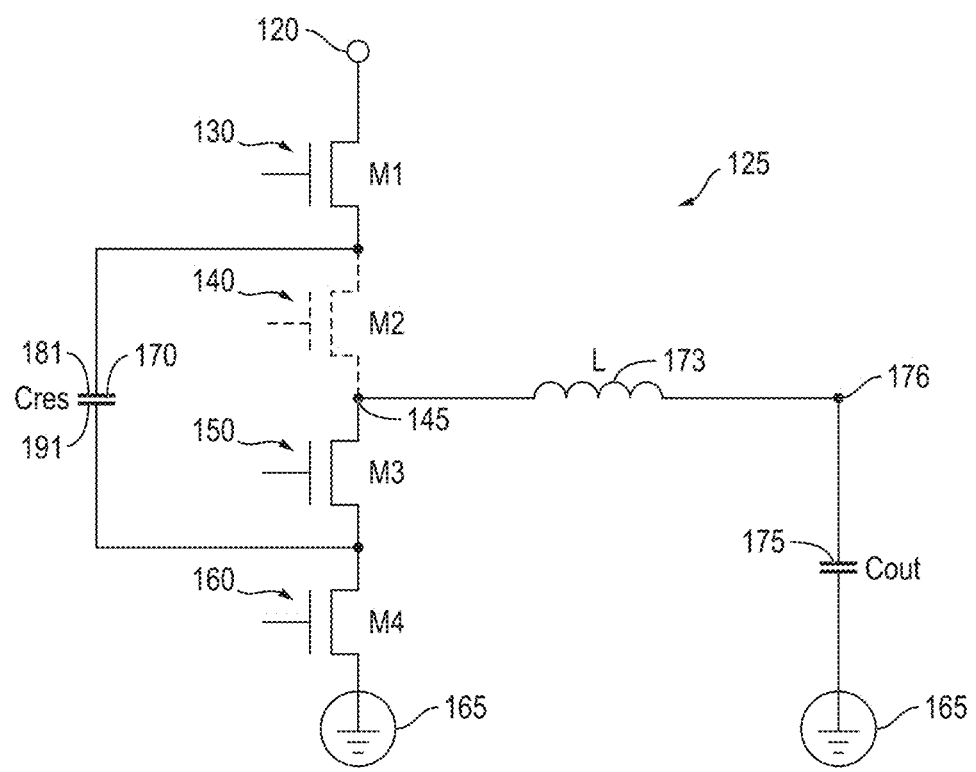
FIG. 23 is a schematic of the switched regulation circuit shown in FIG. 5A in a particular switch configuration according to the switching sequence in FIG. 19.

In the first soft braking configuration (step 1920) first, third and fourth solid-state switches M1, M3 and M4, respectively, are on while second solid-state switch M2 is turned off. A simplified schematic of switched regulation circuit 125 in step 1920 is illustrated in FIG. 23. In this state inductor 173 is coupled to Vin (node 120) through capacitor 170 and also to ground 165 through third and fourth solid-state switches, M3 and M4, respectively, allowing the residual current in the inductor to continue to decrease down to a non-zero minimum current (Imin).

Step 1920 is illustrated in timing diagram 2000 (see FIG. 20) at time t3. Now referring simultaneously to FIGS. 5A and 20, at time t3, fourth solid-state switch 160 (i.e., trace 2020) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. In some embodiments the minimum current (Imin) can be between 10 milliamps and 50 amperes, while in other embodiments it can be between 100 milliamps and 1 ampere and in another embodiment it can be between 200 milliamps and 400 milliamps. The controller then proceeds to step 1925 (see FIG. 19) that is a second prefluxing state that can be used to increase current flowing through inductor 173.

Figure 24:
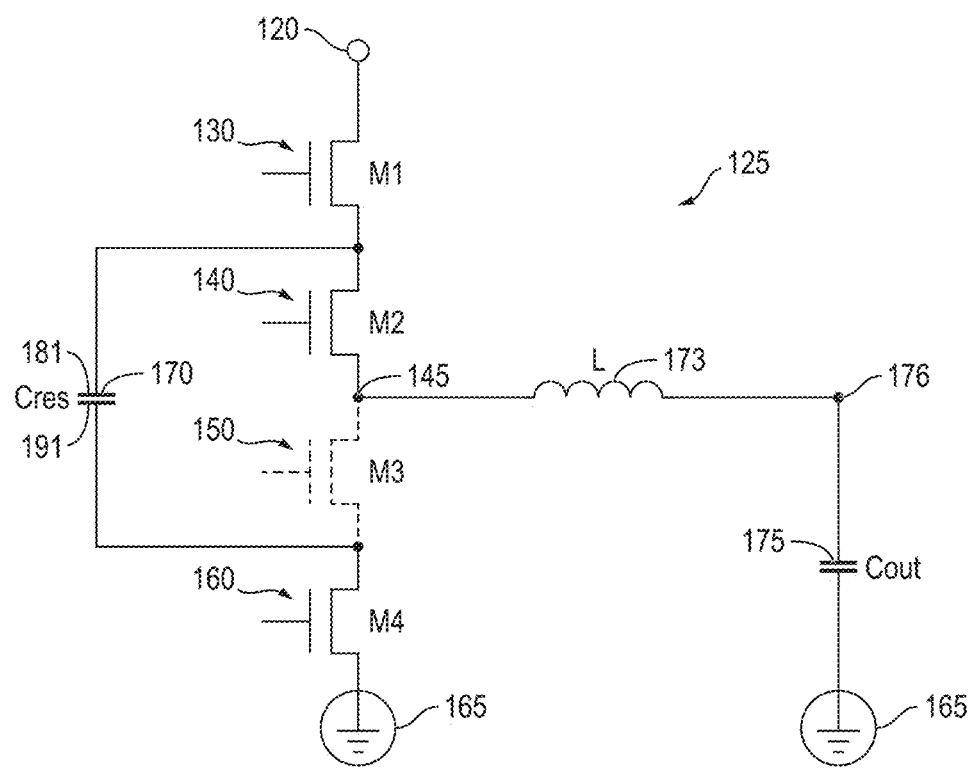
FIG. 24 is a schematic of the switched regulation circuit shown in FIG. 5A in a particular switch configuration according to the switching sequence in FIG. 19.

Now referring to FIG. 19, in step 1925 first and fourth solid-state switches, M1 and M4 remain on, second solid-state switch M2 turns on, and third solid-state switch M3 remains off. A simplified schematic of switched regulation circuit 125 in step 1925 is illustrated in FIG. 24. This is the second inductor prefluxing stage where current in inductor 173 is increased at a substantially linear rate by applying voltage at first output terminal 120 (Vin) to the inductor. In this state the voltage at first terminal 120 (Vin) is applied directly across inductor 173.

Now referring to timing diagram 2000, the second prefluxing state (step 1925) is shown at t4. The voltage at second junction 145 rapidly increases to the Vin voltage at first node 120 shown by trace 2025. Current in inductor 170 (trace 2030) increases rapidly, corresponding to the applied voltage and the characteristics of inductor 173. In some embodiments the rate of current increase can be substantially similar to the rate of current increase in the time between t1 and t2. The current in inductor 173 continues to increase until the switch state is changed, which in one embodiment, may be controlled by a delay shown in step 1930 that can be controlled by a timer, as discussed above.

Figure 25:
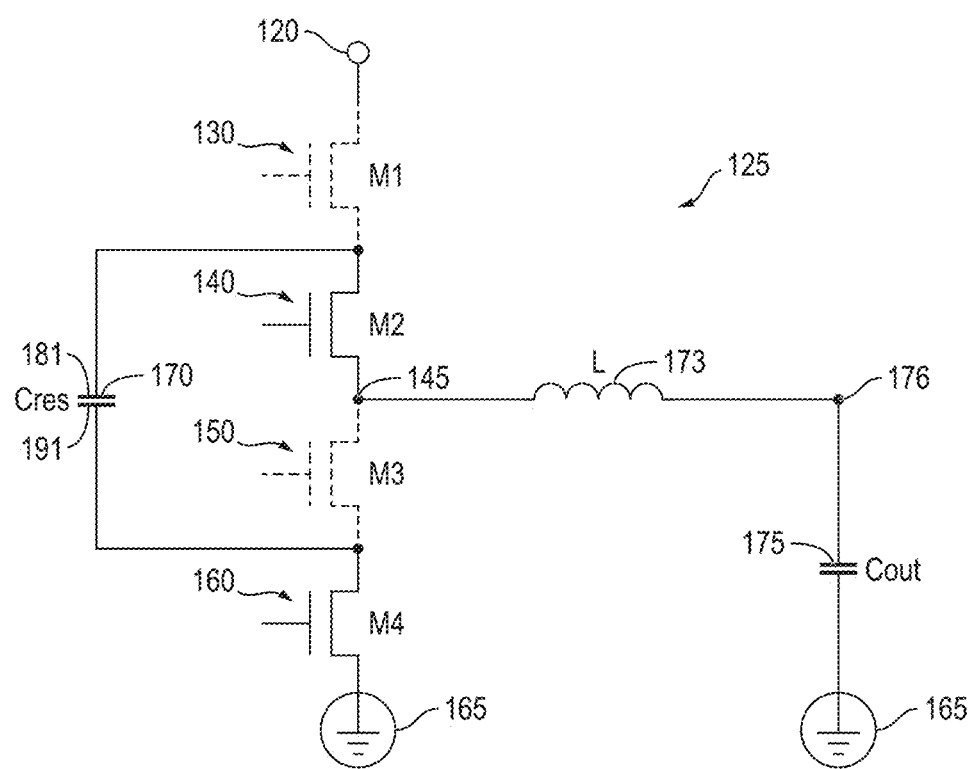
FIG. 25 is a schematic of the switched regulation circuit shown in FIG. 5A in a particular switch configuration according to the switching sequence in FIG. 19.

Now referring to FIG. 19, in step 1935 fourth solid-state switch M4 remains on and second solid-state switch M2 is turned on while first and third solid-state switches M1, M3, respectively, remain off. A simplified schematic of switched regulation circuit 125 in step 1935 is illustrated in FIG. 25. Capacitor 170 is connected between inductor 173 and ground 165, allowing the charge stored in the capacitor to discharge through the inductor to load 115 (see FIG. 1). As capacitor 170 begins to discharge (with a time constant set by capacitor 170 and inductor 173), current in inductor 173 increases. This condition is illustrated in timing diagram 2000 in FIG. 20 at time t5 showing the voltage at second junction 145 (i.e., trace 2025) at a voltage that is close to the voltage at Vin (120) as it is connected to fully charged capacitor 170. As capacitor 170 resonates with inductor 173, it discharges causing current to increase in inductor 173 (i.e., trace 2030). The increase in current causes the voltage at Vout (node 176) to increase. As the charge stored in capacitor 170 is reduced, current in inductor 173 peaks (Ipeak), then begins to decrease (trace 2030).

The controller then proceeds to step 1940 (see FIG. 19) which is a second "soft braking" configuration that can be used to transition the remaining current in inductor 173. Soft braking can enable a higher current per phase and/or a smaller capacitor 170 per phase as discussed above.

Figure 26:
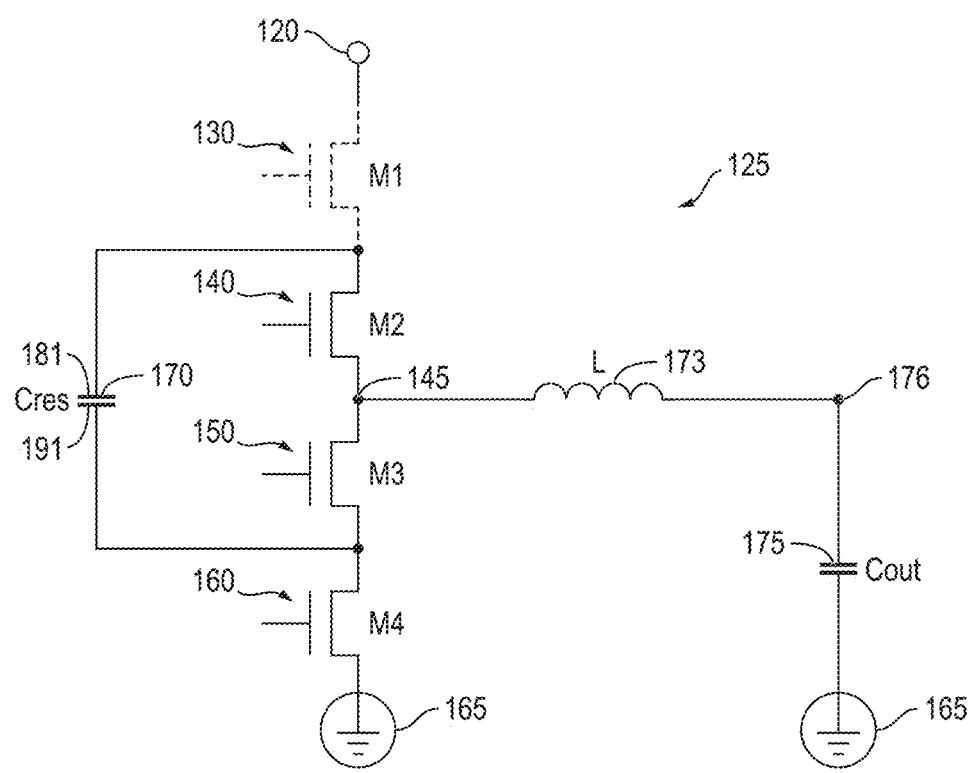
FIG. 26 is a schematic of the switched regulation circuit shown in FIG. 5A in a particular switch configuration according to the switching sequence in FIG. 19.

More specifically, in step 1940 second, third and fourth solid-state switches M2, M3 and M4, respectively, are on while first solid-state switch M1 is turned off. A simplified schematic of switched regulation circuit 125 in step 1935 is illustrated in FIG. 26. In this state inductor 173 is coupled to ground 165 through third and fourth solid-state switches, M3 and M4, respectively, allowing the residual current in the inductor to continue to decrease down to a non-zero minimum current (Imin).

Step 1940 is illustrated in timing diagram 2000 (see FIG. 20) at time t6. Now referring simultaneously to FIGS. 5A and 20, at time t6, third solid-state switch M3 (i.e., trace 2015) turns on adding a path between inductor 173 and ground 165. The voltage at second junction 145 (i.e., trace 2025) remains at the ground potential and current in inductor 173 (trace 2030) continues to decrease as the inductor dissipates its stored energy. Current in inductor 173 continues to decrease to a predetermined minimum current (Imin) that is non-zero in this particular embodiment. The controller then returns to step 1905 (see FIG. 19) which is the first prefluxing state that can be used to increase current flowing through inductor 173.

Timing diagram 2000 in FIG. 20 is for illustration only and is one example of the function of circuit 125 (see FIG. 5A) operating with a non-zero inductor current. Other switching algorithms, control functions and features can be implemented without departing from this disclosure. To control the duration of any of steps 1905-1940 illustrated in FIG. 19 any type of timer or control circuit can be used, including those disclosed herein. For example, in some embodiments a comparator can be used to compare output voltage (Vout) to a commanded voltage. If the output voltage is too low the controller can shorten the soft brake duration and start the next preflux step early, leading to a higher output voltage and higher average output current delivered to load (see FIG. 5A). This control algorithm can also provide a relatively fast response time to loads having high transient voltage requirements. In further embodiments a multi-phase architecture can be employed where multiple switched regulation circuits 125 (see FIG. 2) are used together to provide power to load 115.

In further embodiments alternative switching sequences 1900 can be used to provide additional features and functions of switched regulation circuit 125 (see FIG. 5A). For example, wait states can be added after first and second soft brake steps (steps 1920 and 1940, respectively) to provide light load performance. More specifically, when load 115 (see FIG. 5A) requires a reduced amount of current and/or voltage, after first soft brake (step 1920) a wait state can be commanded where first and fourth solid-state switches, M1 and M4, respectively, are on and second and third solid-state switches, M2 and M3 are off. This essentially halts current flow through circuit 125 to load 115 (see FIG. 5A) until the subsequent preflux step 1925 is commanded. Similarly, after second soft brake (step 1940) a second wait state can be commanded where second and third solid-state switches, M2 and M3, respectively, are on and first and fourth solid-state switches, M1 and M4, respectively, are off. This state essentially halts current flow through circuit 125 until the subsequent preflux step 1905 is commanded.

In some embodiments a comparator control circuit can be included as a portion of the phaser circuit. More specifically, a comparator control circuit can use Vout and the clock signal to only allow the phaser to execute a phase if Vout is below a predetermined voltage and a clock signal is received from the Voltage to Time circuit. This feature can protect against the phaser sending trigger signals to one or more phases if Vout is above the predetermined voltage but due to transients or bandwidth limitations of the control circuit one or more clock signals are sent. Because Vout is above the predetermined voltage no phases will be triggered.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Though the present invention is disclosed by way of specific embodiments as described above, those embodiments are not intended to limit the present invention. Based on the methods and the technical aspects disclosed herein, variations and changes may be made to the presented embodiments by those of skill in the art without departing from the spirit and the scope of the present invention.

What is claimed is:

1. A circuit comprising:
a first power converter phase controlled by a control circuit to deliver a first predetermined quantity of charge to a power output terminal;
a second power converter phase controlled by the control circuit to deliver a second predetermined quantity of charge to the power output terminal;
a first inductor coupled directly between the first power converter phase and the power output terminal; and
a second inductor coupled directly between the second power converter phase and the power output terminal;
wherein the control circuit is arranged to generate a plurality of trigger signals to repeatedly trigger the first and second power converter phases;
wherein the control circuit is arranged to cause the trigger signals to have a variable frequency;
wherein the control circuit is arranged to control a time delay between the first power converter phase delivering the first predetermined quantity of charge and the second power converter phase delivering the second predetermined quantity of charge, and wherein the time delay is based on a difference between a voltage at the power output terminal and a reference voltage, and on the variable frequency; and
wherein the first predetermined quantity of charge and the second predetermined quantity of charge are substantially equal.

2. The circuit of claim 1, wherein the control circuit is further arranged to reduce the time delay when the difference between the voltage at the power output terminal and the reference voltage is increased.

3. The circuit of claim 1, wherein the control circuit is further arranged to increase the time delay when the difference between the voltage at the power output terminal and the reference voltage is reduced.

4. The circuit of claim 1, further comprising a third power converter phase controlled by the control circuit to deliver a third predetermined quantity of charge to the power output terminal, wherein the time delay is a first time delay and a third inductor coupled directly between the third power converter phase and the power output terminal; and wherein the control circuit is further arranged to control a second time delay between the second power converter phase delivering the second predetermined quantity of charge and the third power converter phase delivering the third predetermined quantity of charge, wherein the first time delay is equal to the second time delay, and wherein the second predetermined quantity of charge and the third predetermined quantity of charge are substantially equal.

5. The circuit of claim 1, further comprising an error amplifier arranged to receive the voltage at the power output terminal and the reference voltage, and generate an error voltage based the difference between the voltage at the power output terminal and the reference voltage.

6. The circuit of claim 5, further comprising a voltage to time circuit coupled to the error amplifier, and arranged to receive the error voltage and generate a clock having a period equal to the time delay.

7. The circuit of claim 6, further comprising a phaser circuit coupled to the voltage to time circuit and arranged to receive the clock and generate first and second phaser signals having start times spaced apart by the time delay.

8. A method of operating a circuit, the method comprising:
providing a first power converter phase, the first power converter phase arranged to be controlled by a control circuit to deliver a first predetermined quantity of charge to a power output terminal;

providing a second power converter phase, the second power converter phase arranged to be controlled by the control circuit to deliver a second predetermined quantity of charge to the power output terminal; generating, by the control circuit, a plurality of trigger signals to repeatedly trigger the first and second power converter phases;

providing a first inductor coupled directly between the first power converter phase and the power output terminal;

providing a second inductor coupled directly between the second power converter phase and the power output terminal;

causing, by the control circuit, the trigger signals to have a variable frequency; and controlling, by the control circuit, a time delay between the first power converter phase delivering the first predetermined quantity of charge and the second power converter phase delivering the second predetermined quantity of charge, wherein the time delay is based on a difference between a voltage at the power output terminal and a reference voltage, and on the variable frequency;

wherein the first predetermined quantity of charge and the second predetermined quantity of charge are substantially equal.

9. The method of claim 8, further comprising reducing, by the control circuit, the time delay when the difference between the voltage at the power output terminal and the reference voltage is increasing.

10. The method of claim 8, further comprising increasing, by the control circuit, the time delay when the difference between the voltage at the power output terminal and the reference voltage is reducing.

11. The method of claim 8, further comprising:
providing a third power converter phase, the third power converter phase arranged to be controlled by the control circuit to deliver a third predetermined quantity of charge to the power output terminal, wherein the time delay is a first time delay, wherein the time delay is a first time delay; and
controlling, by the control circuit, a second time delay between the second power converter phase delivering the second predetermined quantity of charge and the third power converter phase delivering the third predetermined quantity of charge, wherein the first time delay is equal to the second time delay, and wherein the second predetermined quantity of charge and the third predetermined quantity of charge are substantially equal.

12. The method of claim 8, further comprising:
providing an error amplifier;
receiving, by the error amplifier, the voltage at the power output terminal and the reference voltage; and
generating, by the error amplifier, an error voltage based the difference between the voltage at the power output terminal and the reference voltage.

13. The method of claim 12, further comprising:
providing a voltage to time circuit;
receiving, by the voltage to time circuit, the error voltage; and
generating, by the voltage to time circuit, a clock having a period equal to the time delay.

14. The method of claim 13, further comprising:
providing a phaser circuit;
receiving, by the phaser circuit, the clock; and
generating, by the phaser circuit, first and second phaser signals having start times spaced apart by the time delay.

15. A circuit comprising:
a first power converter phase coupled to a control circuit and arranged to be controlled by the control circuit to deliver a first predetermined quantity of charge to a power output terminal;
a second power converter phase coupled to the control circuit and arranged to be controlled by the control circuit to deliver a second predetermined quantity of charge to the power output terminal;
a first inductor coupled directly between the first power converter phase and the power output terminal; and
a second inductor coupled directly between the second power converter phase and the power output terminal; and
wherein the control circuit comprises:
an error amplifier arranged to generate an error voltage based on a difference between a voltage at the power output terminal and a reference voltage;
a phaser circuit arranged to generate plurality of trigger signals to repeatedly trigger the first and second power converter phases;
wherein the control circuit is arranged to cause the trigger signals to have a variable frequency;
wherein the control circuit is arranged to control a time delay between the first power converter phase delivering the first predetermined quantity of charge and the second power converter phase delivering the second predetermined quantity of charge, wherein the time delay is based on a difference between a voltage at the power output terminal and the reference voltage and on the variable frequency;
wherein the first predetermined quantity of charge and the second predetermined quantity of charge are substantially equal.

16. The circuit of claim 15, wherein the control circuit is arranged to reduce the time delay when the difference between the voltage at the power output terminal and the reference voltage is increased.

17. The circuit of claim 15, wherein the control circuit is arranged to increase the time delay when the difference between the voltage at the power output terminal and the reference voltage is reduced.

18. The circuit of claim 15, further comprising:
a third power converter phase coupled to the control circuit and arranged to be controlled by the control circuit to deliver a third predetermined quantity of charge to the power output terminal;
wherein:
the time delay is a first time delay;
the control circuit is further arranged to control a second time delay between the second power converter phase and the third power converter phase; and
the first time delay is equal to the second time delay.

19. The circuit of claim 15, wherein the first power converter phase comprises:
a switching node;
a pull up device connected to the switching node and configured to source current to the switching node; and
a pull down device connected to the switching node and configured to sink current from the switching node.

* * * * *